J. WELLS.
Mill Bush.
No. 19,727.
Patented March 23, 1858.
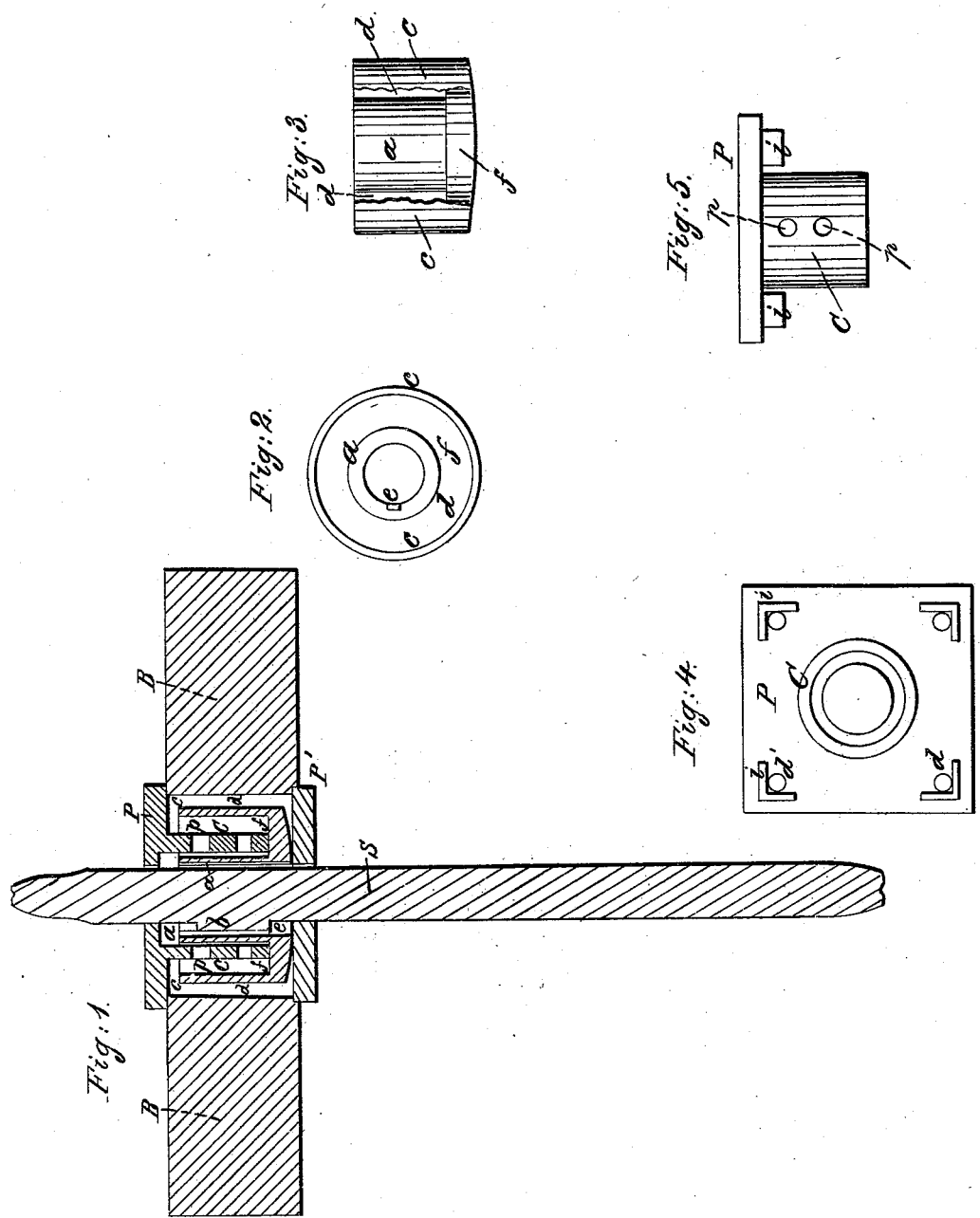

UNITED STATES PATENT OFFICE.

JOHN WELLS, OF BALTIMORE, MARYLAND.

MILL-BUSH.

Specification of Letters Patent No. 19,727, dated March 23, 1858.

*To all whom it may concern:*

Be it known that I, JOHN WELLS, of the city of Baltimore and State of Maryland, have invented a new and useful Improvement in Mill-Bushes; and I do hereby declare that the following is a full, clear, and exact description of the construction and operation of the same, reference being had to the annexed drawing, forming part of this specification, in which—

Figure 1 is a section of bed stone and spindle taken through axis of spindle. Fig. 2 is a top view of collar and oil chamber. Fig. 3 is a side view of same; outer portion of cup being broken away to show collar. Fig. 4 is a plan view of upper plate inverted. Fig. 5 is a side view of same and perforated bearing cylinder.

Similar letters of reference in the several figures denote the same part.

The nature of my invention consists in a plate secured to the top of the bed stone, having a depending perforated cylinder embracing the outer surface of the collar through which the spindle passes; said collar rotating with the spindle which is free to move longitudinally through it; an oil chamber being formed around said collar as will be hereinafter set forth.

In the drawing B is the bed stone and S the spindle.

P is the plate having the perforated cylinder C attached to it. This cylinder is made to fit the outer surface of the collar $a$. This collar fits the spindle and is made to revolve with it by reason of the projection or feather $b$ on the spindle and the recess $e$ in the collar. The collar has a lower flange $f$ and an exterior cylinder $c$, forming an oil chamber $d$ around the collar.

There is a plate P′ under the stone held in position by bolts passing through its corners and the holes $d'$ of plate P. It may have projections similar to those marked $i$ on the upper plate to prevent it from turning.

In operation the several parts have the position shown in Fig. 1. The plate P and cylinder C being firmly secured to the bed stone, and the spindle passing through the collar. The rotation of the spindle carries the collar with it, the friction surfaces being the outer surface of the collar and the inner surface of the cylinder C: oil from chamber $d$ passing through perforations $p$ and lubricating these surfaces. The spindle is also free to move longitudinally through the collar.

Should it be deemed advisable wedge shaped followers may be inserted in the cylinder so as by their forward movement to compensate for any wear between the surfaces in contact. These followers may be moved forward by hand, or they may have springs acting against their heads so as to render them self acting.

I disclaim concentric rims, the one secured to the shaft and the other to the stationary portion of the system, as such is not new and does not constitute my invention.

What I do claim as my invention and desire to secure by Letters Patent, is—

The feathered spindle S and recessed, flanged collar $a$ resting upon plate P′, in combination with plates P′ and P and cylindrical guide C depending from the latter plate; when said parts are arranged for joint operation substantially as set forth.

In testimony whereof, I have hereunto signed my name before two subscribing witnesses.

JOHN WELLS.

Witnesses:
 GEO. PATTEN,
 JOHN S. HOLLINGSHEAD.